(12) United States Patent
Ferrie (10) Patent No.: US 7,797,747 B1
(45) Date of Patent: Sep. 14, 2010

(54) DETECTION OF MALICIOUS CODE IN NON-PAGED POOL UNUSED PAGES

(75) Inventor: Peter Ferrie, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 1242 days.

(21) Appl. No.: 11/359,235

(22) Filed: Feb. 21, 2006

(51) Int. Cl.
*G06F 12/14* (2006.01)

(52) U.S. Cl. .............................. 726/24; 726/22; 726/26

(58) Field of Classification Search .................... 726/24, 726/23, 22; 713/150, 181, 187, 188, 200, 713/165, 167; 705/51, 54; 717/174, 178, 717/168, 173; 711/6, 154, 163, 146, 207, 711/144; 235/375, 380
See application file for complete search history.

(56) References Cited

U.S. PATENT DOCUMENTS

| | | | |
|---|---|---|---|
| 6,594,734 B1 * | 7/2003 | Kyker et al. | 711/146 |
| 6,745,306 B1 * | 6/2004 | Willman et al. | 711/163 |
| 7,328,453 B2 * | 2/2008 | Merkle et al. | 726/23 |
| 7,334,722 B1 * | 2/2008 | Hartmann | 235/375 |
| 2003/0014667 A1 * | 1/2003 | Kolichtchak | 713/201 |

OTHER PUBLICATIONS

Kath, R., "*The Virtual-Memory Manager in Windows NT*", pp. 1-13 [online]. Retrieved on Nov. 12, 2005. Retrieved from the Internet: <URL:http://msdn.microsoft.com/library/en-us/dngenlib/html/msdn__ntvmm.asp?frame=true>.
IA-32 Intel® Architecture Software Developer's Manual, vol. 3: System Programming Guide, Jun. 2005, p. 3-47.
IA-32 Intel® Architecture Software developers manual, vol. 2A: Instruction set reference, A-M, Jun. 2005, p. 3-473.

* cited by examiner

*Primary Examiner*—Pramila Parthasarathy
(74) *Attorney, Agent, or Firm*—Gunnison, McKay & Hodgson, L.L.P.; Forrest Gunnison (57) ABSTRACT

Subsets of non-paged pool unused pages entries are flushed from a translation lookaside buffer (TLB). An attempt to access malicious code within a not present page within the non-paged pool unused pages is made, e.g., by malicious code. The attempt to access the page generates a page fault, which is detected. The page is scanned for malicious code and a determination is made that the page contains malicious code. Protective action is taken to protect a host computer system from the malicious code. Accordingly, malicious code in a page marked not present, i.e., in a page that ordinarily would not be scanned for malicious code, is detected and defeated.

15 Claims, 4 Drawing Sheets

DETECTION OF MALICIOUS CODE IN NON-PAGED POOL UNUSED PAGES

BACKGROUND

1. Field of the Invention

The present invention relates to computer system security. More particularly, the present invention relates to a system and method of detecting malicious code in a computer system.

2. Description of the Related Art

An antivirus scanner, sometimes called memory scanner, scans memory of a computer system to detect malicious code. A trade-off exists between the amount of memory scanned and the speed at which the memory is scanned.

Generally, the greater the amount of memory scanned, the higher is the likelihood that the antivirus scanner will detect malicious code within memory. Stated another way, the greater the amount of memory scanned, the less likely it is that malicious code will be in a memory area that is not scanned. Accordingly, it is desirable to scan as much memory as possible.

Conversely, the greater the amount of memory scanned, the longer it takes for the antivirus scanner to complete the scan. Thus, to increase the speed at which the antivirus scanner scans the memory while at the same time minimizing the likelihood of not scanning a memory area that contains malicious code, only memory areas, e.g., pages, that are likely to contain malicious code are scanned.

To identify memory areas that are likely to contain malicious code, the page tables are interrogated by the antivirus scanner to determine which pages are likely to contain malicious code, e.g., existing pages which are valid.

The antivirus scanner then scans the pages likely to contain malicious code. However, if the malicious code is in a page that is not scanned, the malicious code goes undetected.

SUMMARY OF THE INVENTION

In accordance with one embodiment of the present invention, subsets of non-paged pool unused pages entries are flushed from the translation lookaside buffer (TLB). An attempt to access malicious code within a not present page within the non-paged pool unused pages is made, e.g., by malicious code. For example, the entry, which mapped the virtual address to the physical page address of the page, has been flushed from the translation lookaside buffer as discussed above. Further, the page table entry associated with the page indicates that the page is not present.

Thus, the attempt to access the page generates a page fault, which is detected. The page is scanned for malicious code and a determination is made that the page contains malicious code. Protective action is taken to protect the host computer system from the malicious code. Accordingly, malicious code in a page marked not present, i.e., in a page that ordinarily would not be scanned for malicious code, is detected and defeated.

Embodiments are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 2:
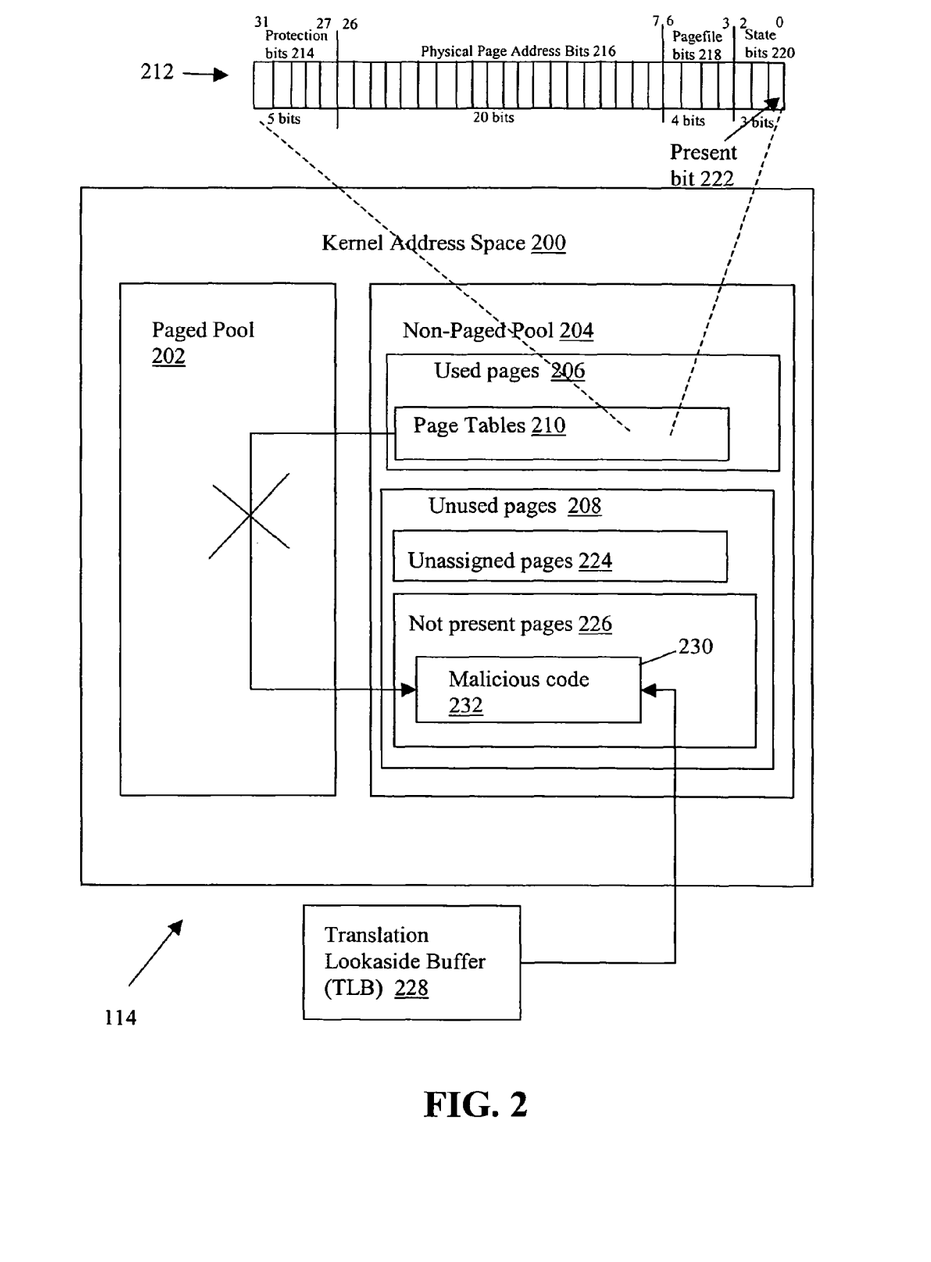
FIG. 2 is a block diagram of a kernel address space of a memory of the host computer system of the client-server system of FIG. 1 in accordance with one embodiment of the present invention.
Figure 3:
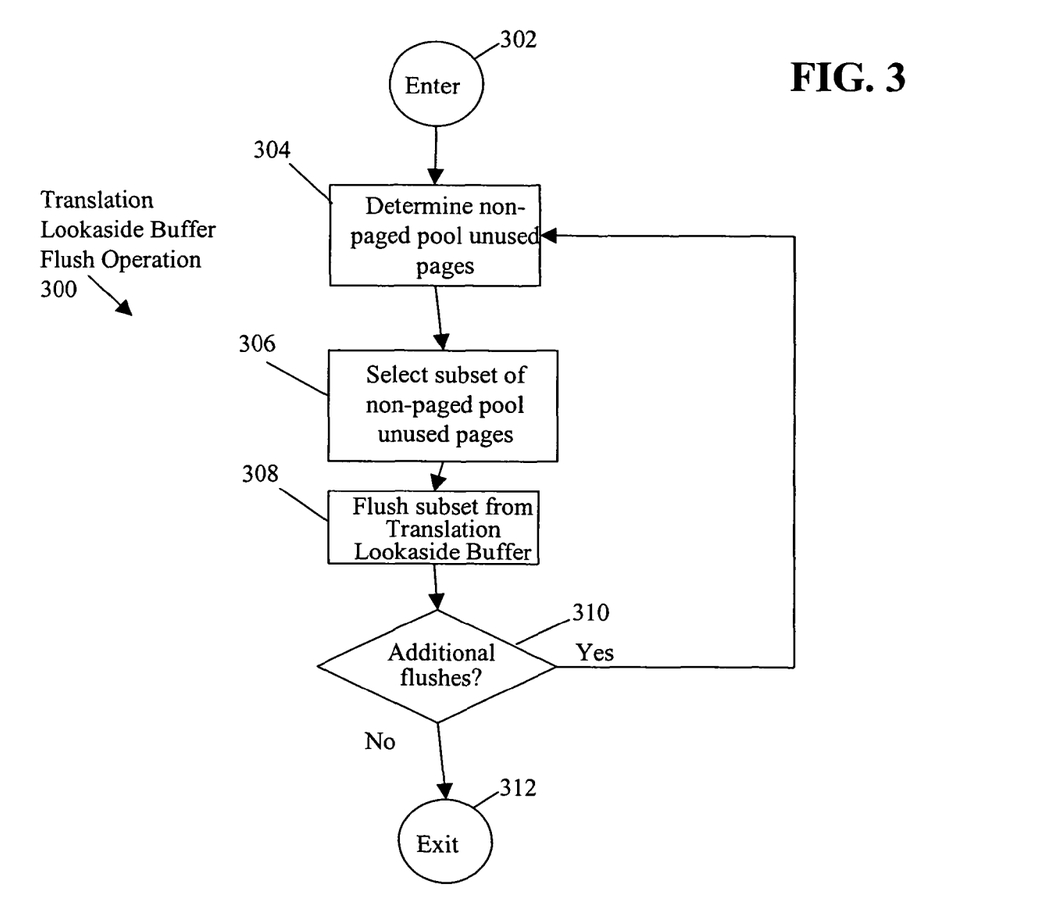
FIG. 3 is a flow diagram of a translation lookaside buffer (TLB) flush operation in accordance with one embodiment of the present invention.

In accordance with one embodiment, referring to FIGS. 2 and 3 together, subsets of non-paged pool unused pages entries are flushed from a translation lookaside buffer (TLB) 228 (OPERATION 308). Non-paged pool unused pages 208 would not contain valid content under ordinary circumstances. Accordingly, flushing the non-paged pool unused pages entries from translation lookaside buffer 228 does not result in any adverse consequences such as a performance penalty in one embodiment. However, to avoid any unwanted or unforeseen consequences such as a performance penalty, only a subset, i.e., not all, of the non-paged pool unused pages entries are flushed at any one time.

Figure 4:
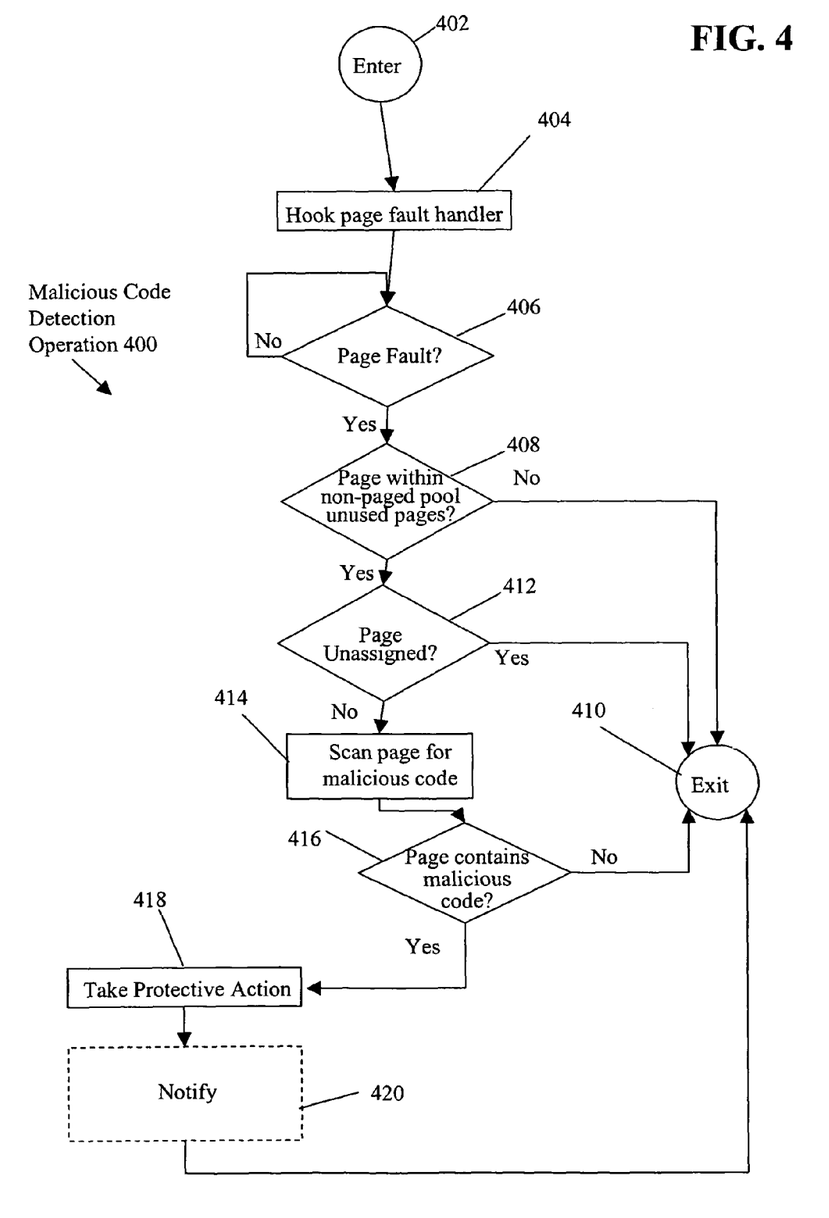
FIG. 4 is a flow diagram of a malicious code detection operation 400 in accordance with one embodiment of the present invention.

Referring now to FIGS. 2 and 4 together, an attempt to access malicious code 232 within a not present page 230 within non-paged pool unused pages 208 is made, e.g., by malicious code. For example, the entry, which mapped the virtual address to the physical page address of page 230, has been flushed from translation lookaside buffer 228 as discussed above. Further, the page table entry associated with page 230 indicates that page 230 is not present.

Thus, the attempt to access page 230 generates a page fault, which is detected (OPERATION 406). Page 230 is scanned for malicious code (OPERATION 414) and a determination is made that page 230 contains malicious code 232 (OPERATION 416). Protective action is taken (OPERATION 418) to protect the host computer system from malicious code 232. Accordingly, malicious code 232 in a page 230 marked not present, i.e., in a page that ordinarily would not be scanned for malicious code, is detected and defeated.

Figure 1:
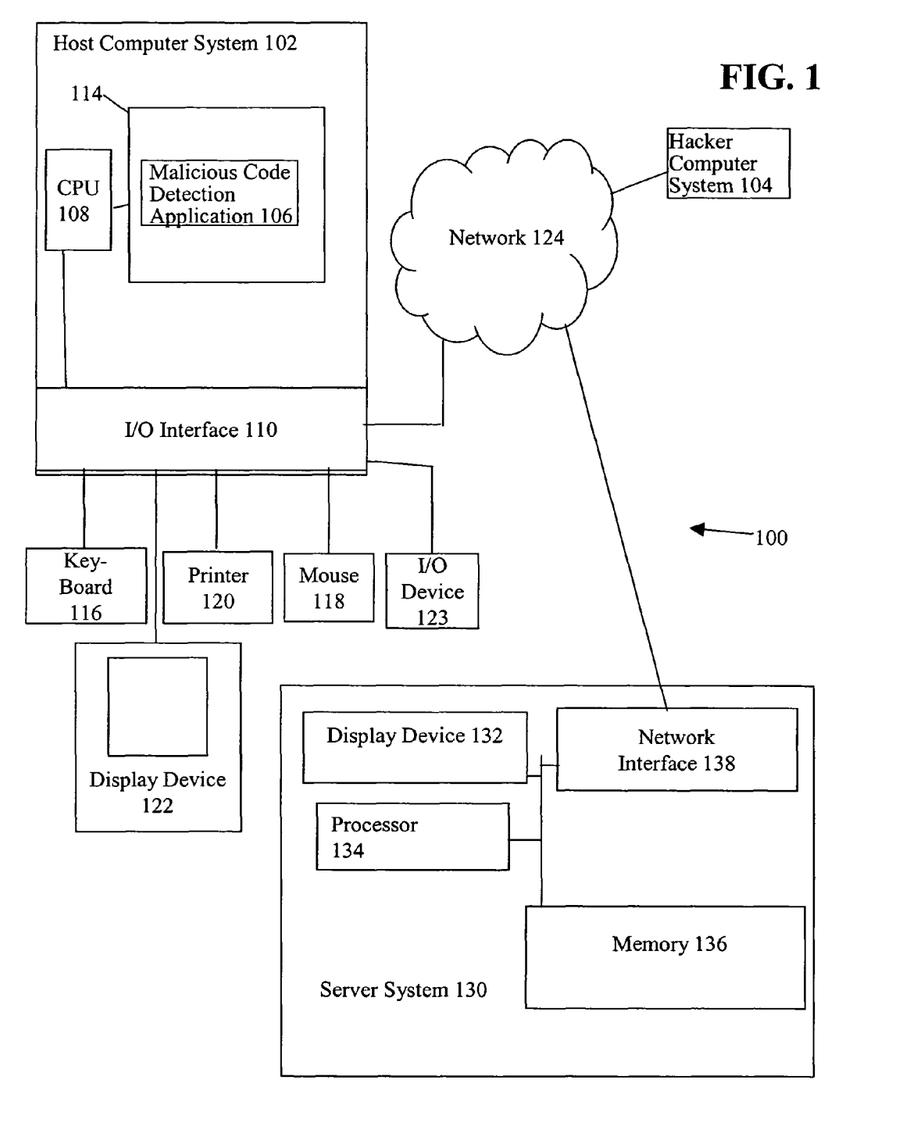
FIG. 1 is a diagram of a client-server system that includes a malicious code detection application executing on a host computer system in accordance with one embodiment of the present invention.

More particularly, FIG. 1 is a diagram of a client-server system 100 that includes a malicious code detection application 106 executing on a host computer system 102 in accordance with one embodiment of the present invention.

Host computer system 102, sometimes called a client or user device, typically includes a central processing unit (CPU) 108, sometimes called a processor 108, an input/output (I/O) interface 110, and a memory 114. Host computer system 102 further includes standard devices like a keyboard 116, a mouse 118, a printer 120, and a display device 122, as well as one or more standard input/output (I/O) devices 123, such as a compact disk (CD) or DVD drive, floppy disk drive, or other digital or waveform ports for inputting data to and outputting data from host computer system 102.

In one embodiment, malicious code detection application 106 is loaded into host computer system 102 via I/O device 123, such as from a CD, DVD, or floppy disk containing malicious code detection application 106.

Host computer system 102 is coupled to a server system 130 of computer system 100 by a network 124. Server system 130 typically includes a display device 132, a processor 134, a memory 136, and a network interface 138. Additional computer systems such as a hacker, e.g., a second, computer system 104 are also associated with network 124.

Network 124 can be any network or network system that is of interest to a user. In various embodiments, network interface 138 and I/O interface 110 include analog modems, digital modems, or a network interface card.

Malicious code detection application 106 is stored, for example, in memory 114 of host computer system 102 and executed on host computer system 102.

The particular type of and configuration of host computer system 102, server system 130, and hacker computer system 104 are not essential to this embodiment of the present invention.

In one embodiment, for example, memory 114 includes a page-based virtual memory system that uses pages, e.g., 4096 byte memory areas. More particularly, some computing environments such as Windows® NT and Windows® 2000 provide page-based virtual memory management schemes that permit programs to realize a 4 GB (gigabyte) virtual memory address space. When the computer system processor is running in virtual memory mode, all addresses are assumed to be virtual addresses and are translated, or mapped, to physical addresses in main memory each time the processor executes a new instruction to access memory. Translated addresses, i.e., cross-referenced virtual addresses and physical addresses, are sometimes called a mapping. One example of a mapping is a page table.

Conventionally, the 4 GB virtual memory address space is divided into two parts: a lower 2 GB user address space, also referred to as user mode address space or ring 3, available for use by a program; and, a high 2 GB system address space, also referred to as kernel mode address space or ring 0, reserved for use by the operating system.

In Windows® NT and Windows® 2000, memory is divided into equal portions termed pages. For example, on 32-bit Intel architectures, also known as IA32, pages are 4 KB in size, whereas Windows® 2000 on an Alpha CPU would use 8 KB pages.

FIG. 2 is a block diagram of a kernel address space 200 of memory 114 of host computer system 102 of client-server system 100 of FIG. 1 in accordance with one embodiment of the present invention. Referring now to FIGS. 1 and 2 together, kernel address space 200, e.g., the upper 2 GB of memory 114, is divided into a paged pool 202 and a non-paged pool 204.

Paged pool 202 includes pages, e.g., 4096 byte memory areas, that are paged. As is well known to those of skill in the art, in a page-based virtual memory system, the hard disk of the computer system is used to store unneeded pages in physical memory in one or more files, e.g., called pagefiles. Pagefiles represent pages of content, e.g., data, that are not currently being used, but may be needed spontaneously at anytime. By swapping pages to and from pagefiles, e.g., by moving content from physical memory to the hard disk and vice versa, pages of memory are made available to applications on demand. Accordingly, much more virtual memory is provided to an application than the available physical memory. One example of physical memory is random access memory (RAM), sometimes called nonpersistent memory.

Thus, paged pool 202 is the pool, sometimes called collection, of pages that can be paged, i.e., swapped to and from pagefiles. Conversely, non-paged pool 204 is the pool, sometimes called collection, of pages that are not paged, i.e., not swapped to and from pagefiles. Stated another way, non-paged pool 204 is the pool of pages that must remain in physical memory.

In one embodiment, anything in the kernel address space, e.g., drivers, can declare itself either paged or non-paged. Drivers thus use paged pool 202 and non-paged pool 204 for dynamic memory allocation in accordance with this embodiment.

In accordance with one embodiment, the operating system is queried to determine the starting address of non-paged pool 204, i.e., where non-paged pool 204 starts, and the size of non-paged pool 204, using any one of a number of techniques depending upon the particular operating system. For example, the operating system calculates the partitioning of paged pool 202 and non-paged pool 204 depending upon the physical memory size and this information is queried. In another example, the registry key HKEY_LOCAL_MACHINE\SYSTEM\CurrentControlSet\Control\Session Manager\Memory Management contains the values "PagedPoolSize", "NonPagedPoolSize". These values allow a user to set specific allocation for paged pool 202 and non-paged pool 204.

Within non-paged pool 204 are used pages 206 and unused pages 208. Used pages 206 are pages that are in use, e.g., that have a page table entry with a valid physical page address and are marked as present. For example, used pages 206 contain content, e.g., drivers, that is being used. Although used pages 206 are illustrated as a single contiguous block in FIG. 2 for simplicity of illustration, it is to be understood that typically used pages 206 are not all contiguous, but are distributed within non-paged pool 204.

Within used pages 206 are page tables 210. Page tables 210 include page table entries, a first page table entry 212 being illustrated. A page table entry identifies the location of a page associated with the page table entry, the page's protection, the page's backing pagefile, and the state of the page.

To illustrate, the first five, i.e., the five most significant, bits of page table entry 212 are protection bits 214. Protection bits 214 are dedicated to page protection for the page associated with page table entry 212, the page sometimes being called a page table entry page.

The next 20 bits following protection bits 214 of page table entry 212 are physical page address bits 216. If the page associate with page table entry 212 is resident in physical memory, the value within physical page address bits 216 represents the physical page address of the page in physical memory. If the page associated with page table entry 212 is paged to the hard disk, the value within physical page address bits 216 represents the offset into the appropriate pagefile to locate the page.

Generally, if there is a non-zero value, sometimes called a valid physical page address, within physical page address bits 216, the page associated with page table entry 212 is assigned. In one embodiment, a page is assigned if the virtual address of the page is mapped to a physical page address in physical memory or to a pagefile on the hard disk. Conversely, if the value within physical page address bits 216 is zero, i.e., all 20 bits of physical page address bits 216 contain a zero, sometimes called an invalid physical page address, the page is unassigned. A page is unassigned if the virtual address of the page is not mapped to a physical page address in physical memory or to a pagefile on the hard disk.

The next four bits following physical page address bits 216 of page table entry 212 are pagefile bits 218. Pagefile bits 218 are used to indicate which pagefile backs the page associated with page table entry 212.

The final three bits, i.e., the three least significant bits, of page table entry 212 are state bits 220. The value within state bits 220 indicates the state of the page associated with page table entry 212

The least significant bit of state bits 220 is a present bit 222. The value within present bit 222 determines whether the page associated with page table entry 212 is present or not. In one embodiment, a page is present if it is a valid page, e.g., a legitimate page that may or may not contain content. For example, a page is present if the value within present bit 222 is a one (1). Conversely, a page is not present if it is an invalid page, e.g., not a valid page. For example, a page is not present if the value within present bit 222 is a zero (0).

Although page tables 210 are illustrated as being in non-paged pool 204, in another embodiment, page tables 210 are in paged pool 202 or are distributed between paged pool 202 and non-paged pool 204 depending upon the particular operating system.

Unused pages 208 are pages that are not in use, e.g., that have a page table entry with an invalid physical page address or are marked as not present. For example, unused pages 208 do not, or at least should not, contain content or are otherwise unused. Although unused pages 208 are illustrated as a single contiguous block in FIG. 2 for simplicity of illustration, it is to be understood that typically unused pages 208 are not all contiguous, but are distributed within non-paged pool 204.

Unused pages 208 include unassigned pages 224 and not present pages 226. Unassigned pages 224 are pages that have not been assigned. Further, not present pages 226 are pages that are not present. Although unused pages 208, unassigned pages 224, and not present pages 226 are illustrated as single contiguous blocks in FIG. 2 for simplicity of illustration, it is to be understood that typically unused pages 208, unassigned pages 224, and not present pages 226 are not all contiguous, but are distributed within non-paged pool 204.

In one embodiment, processor 108 of host computer system 102 includes a translation lookaside buffer (TLB) 228. Translation lookaside buffer 228, sometimes called an internal or on-chip cache, is a buffer that is used to access the location of a physical address. Specifically, translation lookaside buffer 228 is used to provide a direct connection, sometimes called mapping or translation, between frequently used virtual addresses and their corresponding physical page addresses. Using translation lookaside buffer 228, i.e., a hardware component, to translate a virtual address is much faster than using both the page directory and page tables to translate the virtual address using software.

Each entry in translation lookaside buffer 228 includes a virtual address and a corresponding page table entry to identify the page associated with the virtual address. Each time a virtual address is translated to a physical page address, an entry is added to translation lookaside buffer 228, the entry including the translated virtual address and the associated page table entry.

The manufacturer of CPU 108 provides the algorithms for the order in which entries are flushed, sometimes called invalidated, from translation lookaside buffer 228. In one example, an entry in translation lookaside buffer 228 is marked to be persistent in translation lookaside buffer 228, i.e., to never be flushed from translation lookaside buffer 228, absent an explicit instruction to do so.

For example, in Intel's Pentium pro processor, the page global enable (PGE) flag in register CR4 and the global (G) flag of a page-directory or page-table entry (bit 8) can be used to prevent an entry in translation lookaside buffer 228 from being flushed. The page global enable (PGE) flag is described in IA-32 Intel® Architecture Software Developer's Manual, Volume 3: System Programming Guide, June 2005, page 3-47, which is herein incorporated by reference in its entirety.

However, malicious code can access a page in which the malicious code is located such that an entry corresponding to the page in which the malicious code is located is added to translation lookaside buffer 228. Further, malicious code marks the entry in translation lookaside buffer 228 associated with the page in which the malicious code is located to be persistent, such that the entry is not flushed from translation lookaside buffer 228. Next, the malicious code marks the page in the associated page table entry as being not present. Any conventional memory scanner thus relying upon page tables 210 to determine which pages should be scanned will not scan the page in which the malicious code is located as the page is marked as not present, and thus would not contain valid content under normal circumstances. In one embodiment, malicious code is any computer program, module, set of modules, or code that enters a computer system environment without an authorized user's knowledge and/or without an authorized user's consent.

To illustrate, a page 230 in which malicious code 232 is located is accessed. This causes an entry to be added to translation lookaside buffer 228, the entry translating the virtual address of page 230 to the physical page address of page 230. Malicious code then marks the page table entry associated with page 230 in page tables 210 to indicate that page 230 is not present. Thus, page 230 is not indicated in page tables 210 as being in used pages 206. However, page 230 can still be accessed using translation lookaside buffer 228 to translate the virtual address of page 230 to the corresponding physical page address.

FIG. 3 is a flow diagram of a translation lookaside buffer (TLB) flush operation 300 in accordance with one embodiment of the present invention. Referring now to FIG. 3, from an ENTER OPERATION 302, flow moves to a DETERMINE NON-PAGED POOL UNUSED PAGES OPERATION 304. In DETERMINE NON-PAGED POOL UNUSED PAGES OPERATION 304, the non-paged pool unused pages are determined. The non-paged pool unused pages are the subset of unused pages in the non-paged pool, e.g., unused pages 208 in non-paged pool 204.

For example, the non-paged pool, e.g., non-paged pool 204, is determined. Illustratively, the starting virtual address of non-paged pool 204, and, optionally, the size of non-paged pool 204, are determined as described above.

The page table entries associated with the pages within non-paged pool 204 are then queried, sometimes called inspected, to determine whether the pages are used pages, e.g. used pages 206, or unused pages, e.g., unused pages 208. For example, if the page table entry contains a valid physical page address and the page is marked as present as discussed above, the page is within used pages 206. Conversely, if the page table entry contains an invalid physical page address or the page is marked as not present as discussed above, the page is within unused pages 208.

From DETERMINE NON-PAGED POOL UNUSED PAGES OPERATION 304, flow moves to a SELECT SUBSET OF NON-PAGED POOL UNUSED PAGES OPERATION 306. In SELECT SUBSET OF NON-PAGED POOL UNUSED PAGES OPERATION 306, a subset of the non-paged pool unused pages determined in DETERMINE NON-PAGED POOL UNUSED PAGES OPERATION 304 is selected. Any one of a number of techniques can be used to select the subset. For example, in one embodiment, pages within the non-paged pool unused pages are randomly selected. In another example, pages within the non-paged pool unused pages are deterministically selected, i.e., nonrandomly, for example, in a linear fashion.

From SELECT SUBSET OF NON-PAGED POOL UNUSED PAGES OPERATION 306, flow moves to a FLUSH SUBSET FROM TRANSLATION LOOKASIDE BUFFER OPERATION 308. In FLUSH SUBSET FROM TRANSLATION LOOKASIDE BUFFER OPERATION 308, the subset selected in SELECT SUBSET OF NON-PAGED POOL UNUSED PAGES OPERATION 306 is flushed from the translation lookaside buffer. More particularly, if there are any translation lookaside buffer entries corresponding to the pages selected from the non-paged pool unused pages, the entries are flushed, i.e., removed or invalidated, from the translation lookaside buffer. Thus, it is to be understood that flushing of a page from the translation lookaside buffer means to flush the translation lookaside buffer entry that maps the virtual address of the page from the translation lookaside buffer.

In one embodiment, the INVLPG instruction with the exact addresses of the subset is used to flush the subset of non-paged pool unused pages from the translation lookaside buffer. The INVLPG instruction is described in IA-32 Intel® Architecture Software developers manual, Volume 2A: Instruction set reference, A-M, June 2005, page 3-473, herein incorporated by reference in its entirety.

As discussed above, non-paged pool unused pages would not contain valid content under ordinary circumstances. Accordingly, flushing non-paged pool unused pages from the translation lookaside buffer should not result in any adverse consequences such as a performance penalty in one embodiment. However, to avoid any unwanted or unforeseen consequences such as a performance penalty, only a subset, i.e., not all, of the non-paged pool unused pages are flushed at any one time.

From FLUSH SUBSET FROM TRANSLATION LOOKASIDE BUFFER OPERATION 308, flow moves to an ADDITIONAL FLUSHES CHECK OPERATION 310. In ADDITIONAL FLUSHES CHECK OPERATION 310, a determination is made as to whether additional flushes of the translation lookaside buffer should be performed, e.g., are necessary.

If a determination is made that no additional flushes are necessary, flow moves to an EXIT OPERATION 312.

Conversely, if a determination is made that an additional flush is necessary, flow returns from ADDITIONAL FLUSHES CHECK OPERATION 310 to DETERMINE NON-PAGED POOL UNUSED PAGES OPERATION 304. In accordance with this embodiment, OPERATIONS 304, 306, 308, and 310 are repeated until a determination is made that no additional flushes are necessary in ADDITIONAL FLUSHES CHECK OPERATION 310, and flow moves to and exits at EXIT OPERATION 312. By repeatedly performing OPERATIONS 304, 306, and 308, the entire set of entries associated with the non-paged pool unused pages are flushed from the translation lookaside buffer.

FIG. 4 is a flow diagram of a malicious code detection operation 400 in accordance with one embodiment of the present invention. Referring now to FIGS. 2 and 4 together, from an ENTER OPERATION 402, flow moves to a HOOK PAGE FAULT HANDLER OPERATION 404. In HOOK PAGE FAULT HANDLER OPERATION 404, the page fault handler, e.g., an exception handler, is hooked. More particularly, a page fault is an interrupt (or exception) raised by the hardware, e.g., CPU 108, when a program accesses a page that is not mapped in physical memory. A page fault handler is a function that tries to handle the page fault by making the page accessible at a location in physical memory or terminating the program in case it is an illegal access.

Hooking is accomplished according to a variety of techniques, as is well known in the art. To illustrate, the page fault handler is hooked to facilitate interception of invocation of, e.g., calls to, the page fault handler. In one embodiment, the page fault handler is hooked by inserting a jump instruction directly into the page fault handler.

As is well known to those of skill in the art, a system service table, sometimes called a dispatch table or a system call table, relates system calls to specific addresses within an operating system kernel. In one embodiment, a hooked system service table redirects calls to the page fault handler. For example, the hooked system service table redirects page fault handler calls to a module of malicious code detection application 106 instead of directing the call to the page fault handler.

From HOOK PAGE FAULT HANDLER OPERATION 404, flow moves to a PAGE FAULT CHECK OPERATION 406. In PAGE FAULT CHECK OPERATION 406, a determination is made as to whether a page fault has occurred. Illustratively, a page fault has occurred and an attempt to invoke, e.g., a call to, the page fault handler is detected as discussed above.

Illustratively, paying particular attention to FIG. 2, an attempt to access page 230 containing malicious code 232 is made. Performance of translation lookaside buffer flush operation 300 of FIG. 3 as described above has flushed the entry from translation lookaside buffer 228 which mapped the virtual address to the physical page address of page 230. Further, as discussed above, the page table entry in page tables 210 associated with page 230 indicates that page 230 is not present. Thus, a page fault is raised and this page fault is detected in PAGE FAULT CHECK OPERATION 406. Generally, the page fault handler is hooked in HOOK PAGE FAULT HANDLER OPERATION 404 to facilitate detection of the page fault in PAGE FAULT CHECK OPERATION 406.

Paying particular attention to FIG. 4, if a determination is made that a page fault has not occurred in PAGE FAULT CHECK OPERATION 406, flow returns (remains) at PAGE FAULT CHECK OPERATION 406. Conversely, if a determination is made that a page fault has occurred in PAGE FAULT CHECK OPERATION 406, flow moves to a PAGE WITHIN NON-PAGED POOL UNUSED PAGES CHECK OPERATION 408.

In PAGE WITHIN NON-PAGED POOL UNUSED PAGES CHECK OPERATION 408, a determination is made as to whether the page associated with the page fault is within the non-paged pool unused pages. For example, the virtual address of the page associated with the page fault is compared to the virtual addresses of the non-paged pool unused pages. If a match occurs with any of the virtual addresses of the non-paged pool unused pages, a determination is made that the page is within the non-paged pool unused pages. Conversely, if a match does not occur, a determination is made that the page is not within the non-paged pool unused pages.

If a determination is made that the page associated with the page fault is not within the non-paged pool unused pages, flow moves to and exits at an EXIT OPERATION 410 or returns to PAGE FAULT CHECK OPERATION 406 and awaits the next page fault. In this case, the page fault is not associated with malicious code within the non-paged pool unused pages.

Conversely, if a determination is made that the page associated with the page fault is within the non-paged pool unused pages, flow moves to a PAGE UNASSIGNED CHECK OPERATION 412. To illustrate, paying particular attention again to FIG. 2, a determination is made that page 230 associated with the page fault is within unused pages 208 of non-paged pool 204.

Paying particular attention to FIG. 4, in PAGE UNASSIGNED CHECK OPERATION 412, a determination is made as to whether the page associated with the page fault is an unassigned page. For example, the virtual address of the page associated with the page fault is compared to the virtual addresses of the unassigned pages of the non-paged pool unused pages. If a match occurs with any of the virtual addresses of the unassigned pages, a determination is made that the page is unassigned. Conversely, if a match does not occur, a determination is made that the page is not unassigned, sometimes called assigned.

If a determination is made that the page associated with the page fault is unassigned, flow moves to and exits at EXIT OPERATION 410 or returns to PAGE FAULT CHECK OPERATION 406. In this case, because the page is unassigned, a physical page address for the page attempting to be accessed is unobtainable, i.e., it is not readily possible to determine which page is attempting to be accessed. Accordingly, flow exits at EXIT OPERATION 410 or returns to PAGE FAULT CHECK OPERATION 406 and awaits the next page fault.

Conversely, if a determination is made that the page associated with the page fault is not unassigned, i.e., is a not present page, flow moves to a SCAN PAGE FOR MALICIOUS CODE OPERATION 414. In this case, the page associated with the page fault is available, although it is marked as not present. To illustrate, referring again to FIG. 2, a determination is made that page 230 is not within unassigned pages 224, i.e., is within not present pages 226.

Referring again to FIG. 4, in SCAN PAGE FOR MALICIOUS CODE OPERATION 414, the page is scanned for malicious code. Illustratively, the page is scanned for known malicious code signatures, heuristically or otherwise. To illustrate, paying particular attention again to FIG. 2, page 230 is scanned.

Referring again to FIG. 4, from SCAN PAGE FOR MALICIOUS CODE OPERATION 414, flow moves to a PAGE CONTAINS MALICIOUS CODE CHECK OPERATION 416. In PAGE CONTAINS MALICIOUS CODE CHECK OPERATION 416, a determination is made as to whether the page contains malicious code based on the scan of the page performed in SCAN PAGE FOR MALICIOUS CODE OPERATION 414.

If a determination is made that the page does not contain malicious code, flow moves from PAGE CONTAINS MALICIOUS CODE CHECK OPERATION 416 and exits at EXIT OPERATION 410 or returns to PAGE FAULT CHECK OPERATION 406 and awaits the next page fault. In this event, the page attempting to be accessed does not contain malicious code and thus flow exits at EXIT OPERATION 410 or returns to PAGE FAULT CHECK OPERATION 406.

Conversely, if a determination is made that the page contains malicious code, flow moves from PAGE CONTAINS MALICIOUS CODE CHECK OPERATION 416 to a TAKE PROTECTIVE ACTION OPERATION 418. Paying particular attention to FIG. 2, a determination is made that page 230 contains malicious code 232 in PAGE CONTAINS MALICIOUS CODE CHECK OPERATION 416, and thus flow moves to TAKE PROTECTIVE ACTION OPERATION 418.

In TAKE PROTECTIVE ACTION OPERATION 418, protective action is taken to protect the host computer system from the malicious code. Illustratively, the malicious code is prevented from being executed or accessed. The malicious code is quarantined or deleted in one embodiment. The program attempting to access the malicious code containing page is terminated in one embodiment. Although various examples are provided, other protective actions can be taken depending on the particular implementation. In one embodiment, the user of the host computer system is asked for permission prior to taking protective action. To illustrate, referring again to FIG. 2, malicious code 232 is deleted.

From TAKE PROTECTIVE ACTION OPERATION 418, flow moves optionally to a NOTIFY OPERATION 420 (or to EXIT OPERATION 410/PAGE FAULT CHECK OPERATION 406 if NOTIFY OPERATION 420 is not performed). In optional NOTIFY OPERATION 420, the user of host computer system 102 (FIG. 1), and/or a system administrator of the network, e.g., network 124, are notified of a malicious code detection on host computer system 102. In one embodiment, a record or error message is generated and provided to the user and/or system administrator. In one embodiment, the notification identifies the particular malicious code and/or any protective action taken.

The user and/or administrator are notified using any one of a number of techniques, e.g., by using a pop up window, by generating an e-mail, by writing to a file and/or otherwise by logging the event. Further, in one embodiment, a notification is provided to a security center. From optional NOTIFY OPERATION 420, processing transitions to EXIT OPERATION 410, or returns to PAGE FAULT CHECK OPERATION 406 and awaits the next page fault.

Accordingly, an attempt to access malicious code within a not present page within the non-paged pool unused pages is made, e.g., by malicious code. Performance of translation lookaside buffer flush operation 300 of FIG. 3 as described above has flushed the entry, which mapped the virtual address to the physical page address of the page, from the translation lookaside buffer. Further, the page table entry associated with the page indicates that the page is not present.

Thus, the attempt to access the page generates a page fault, which is detected. The page is scanned for malicious code and a determination is made that the page contains malicious code. Protective action is taken to protect the host computer system from the malicious code. Accordingly, malicious code in a page marked not present, i.e., in a page that ordinarily would not be scanned for malicious code, is detected and defeated.

Referring again to FIG. 1, although malicious code detection application 106 is referred to as an application, this is illustrative only. Malicious code detection application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention is carried out using any suitable hardware configuration or means involving a personal computer, a workstation, a portable device, or a network of computer devices. Other network configurations other than client-server configurations, e.g., peer-to-peer, web-based, intranet, and internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium belongs to the computer system itself. However, the medium is also removed from the computer system. For example, malicious code detection application 106 is stored in memory that is physically located in a location different from processor 108, e.g., memory 136 of server system 130. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that execute malicious code detection application 106 in accordance with at least one of the embodiments as described herein. Similarly, in another embodiment, host computer system 102 and/or server system 130 is comprised of multiple different computers, wireless devices, cellular telephones, digital telephones, two-way pagers, personal digital assistants, server computers, or any desired combination of these devices that are interconnected to perform the methods as described herein.

In view of this disclosure, malicious code detection application 106 in accordance with one embodiment of the present invention can be implemented in a wide variety of computer system configurations. In addition, malicious code detection application 106 could be stored as different modules in memories of different devices. For example, malicious code detection application 106 could initially be stored in server system 130, and as necessary, a portion of malicious code detection application 106 could be transferred to host computer system 102 and executed on host computer system 102. Consequently, part of the malicious code detection functionality would be executed on processor 134 of server system 130, and another part would be executed on processor 108 of host computer system 102. In view of this disclosure, those of skill in the art can implement various embodiments of the present invention in a wide variety of physical hardware configurations using an operating system and computer programming language of interest to the user.

In yet another embodiment, malicious code detection application 106 is stored in memory 136 of server system 130. Malicious code detection application 106 is transferred over network 124 to memory 114 in host computer system 102. In this embodiment, network interface 138 and I/O interface 110 would include analog modems, digital modems, or a network interface card. If modems are used, network 124 includes a communications network, and malicious code detection application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer-implemented method comprising:
   executing, on a processor, a malicious code detection application wherein said executing comprises:
   determining non-paged pool unused pages in a non-paged pool,
   wherein non-paged pool pages in said non-paged pool are not swapped to and from pagefiles;
   said non-paged pool pages are non-paged pool used pages and said non-paged pool unused pages;
   selecting a subset of said non-paged pool unused pages;
   flushing non-paged pool unused pages entries corresponding to said subset from a translation lookaside buffer (TLB);
   detecting a page fault associated with an attempted access to a page
   determining whether the page is within the non-paged pool unused pages in said non-paged pool;
   determining whether said page contains malicious code upon finding that the page is within the non-paged pool unused pages in said non-paged pool; and
   taking protective action, upon finding that the page contains malicious code, to protect a computer system from said malicious code.

2. The computer-implemented method of claim 1 further comprising determining whether additional flushes of said translation lookaside buffer are necessary.

3. The computer-implemented method of claim 1 further comprising repeatedly performing said determining, said selecting, and said flushing.

4. The computer-implemented method of claim 1 further comprising repeatedly performing said determining whether additional flushes of said translation lookaside buffer are necessary, said selecting, and said flushing until all entries in said translation lookaside buffer are flushed.

5. The computer-implemented method of claim 1 further comprising hooking a page fault handler to facilitate said detecting.

6. The computer-implemented method of claim 1 wherein an entry corresponding to said page has been flushed from said translation lookaside buffer in said flushing.

7. The computer-implemented method of claim 6 wherein said entry mapped a virtual address to a physical page address of said page.

8. The computer-implemented method of claim 1 wherein said determining whether said page is within said non-paged pool unused pages comprises determining whether a virtual address of said page matches any of virtual addresses of said non-paged pool unused pages.

9. The computer-implemented method of claim 1 wherein upon a determination that said page is within said non-paged pool unused pages, said determining whether said page contains malicious code further comprises determining whether said page is unassigned.

10. The computer-implemented method of claim 9 wherein said determining whether said page is unassigned comprises determining whether a virtual address of said page matches any of virtual addresses of unassigned pages of said non-paged pool unused pages.

11. The computer-implemented method of claim 9 wherein upon a determination that said page is not unassigned, said determining whether said page contains malicious code further comprises scanning said page for malicious code.

12. The computer-implemented method of claim 1 further comprising providing a notification that said protective action has been taken.

13. The computer-implemented method of claim 1 wherein a page table entry associated with said page comprises physical page address bits and a present bit, said physical page address bits comprising a valid physical page address, a value within said present bit indicating that said page is not present, said page being a not present page in said non-paged pool unused pages.

14. A computer system comprising:

a memory having stored therein a malicious code detection application; and a processor coupled to said memory, wherein execution of said malicious code detection application generates a method comprising:

determining non-paged pool unused pages in a non-paged pool, wherein non-paged pool pages in said non-paged pool are not swapped to and from pagefiles;

said non-paged pool pages are non-paged pool used pages and said non-paged pool unused pages;

selecting a subset of said non-paged pool unused pages;

flushing non-paged pool unused pages entries corresponding to said subset from a translation lookaside buffer (TLB);

detecting a page fault associated with an attempted access to a page determining whether the page is within the non-paged pool unused pages in said non-paged pool;

determining whether said page contains malicious code upon finding that the page is within the non-paged pool unused pages in said non-paged pool; and taking protective action, upon finding that the page contains malicious code, to protect a computer system from said malicious code.

15. A computer-program product comprising a computer readable medium containing computer program code comprising:

a malicious code detection application for determining non-paged pool unused pages in a non-paged pool, wherein non-paged pool pages in said non-paged pool are not swapped to and from pagefiles;

said non-paged pool pages are non-paged pool used pages and said non-paged pool unused pages;

said malicious code detection application further for selecting a subset of said non-paged pool unused pages;

said malicious code detection application further for flushing non-paged pool unused pages entries corresponding to said subset from a translation lookaside buffer (TLB);

said malicious code detection application further for detecting a page fault associated with an attempted access to a page said malicious code detection application further for determining whether the page is within the non-paged pool unused pages in said non-paged pool;

said malicious code detection application further for determining whether said page contains malicious code upon finding that the page is within the non-paged pool unused pages in said non-paged pool; and said malicious code detection application further for taking protective action, upon finding that the page contains malicious code, to protect a computer system from said malicious code.

* * * * *